June 4, 1968 W. D. ISRAEL ET AL 3,387,177

HIGH RISE THYRATRON PULSE SUPPLY

Filed March 9, 1965 2 Sheets-Sheet 1

INVENTORS
WILLIAM D. ISRAEL
WILLIAM B. McCARTNEY
EDWARD O. UHRIG

BY [signature]

ATTORNEY

June 4, 1968 W. D. ISRAEL ET AL 3,387,177

HIGH RISE THYRATRON PULSE SUPPLY

Filed March 9, 1965 2 Sheets-Sheet 2

INVENTORS
WILLIAM D. ISRAEL
WILLIAM B. McCARTNEY
EDWARD O. UHRIG

BY Henry Hansen

ATTORNEY

United States Patent Office 3,387,177
Patented June 4, 1968

3,387,177

HIGH RISE THYRATRON PULSE SUPPLY

William D. Israel, Ellicott City, William B. McCartney, Glen Burnie, and Edward O. Uhrig, Catonsville, Md., assignors, by mesne assignments, to the United States of America as represented by the Secretary of the Navy Filed Mar. 9, 1965, Ser. No. 438,436
13 Claims. (Cl. 315—209)

ABSTRACT OF THE DISCLOSURE

A high rise pulse supply produces a high output pulse across a relatively low output resistance with a rise time plus delay in the circuit of very short duration, as less than 100 nanoseconds. A pair of electronic switches are used in series to activate a step-up transformer connected to a thyratron load. The switches are powered from a converter power supply utilizing a third electronic switch fed from a low voltage D.C. battery and activated by a pulse source. The circuit is intermittently operated to conserve power and is automatically recycled.

The present invention relates to voltage pulse supplies for communications equipment such as radar and more particularly to a high voltage pulse supply powered by a D.C. battery of low voltage.

In the field of pulse power supplies it has been the general practice to employ thyratrons actuated by step-up transformers operated by a D.C. battery and some form of pulsing system to actuate the transformer. These devices have not proven entirely satisfactory in producing high rise pulse supplies. The upper limit on the voltage pulse output available is low and rise time on the pulse produced is long.

The general purpose of this invention is to provide a high rise pulse supply having an output pulse of 500 volts or more across 1000 ohms with a rise time plus delay in the circuit of less than 100 nanoseconds. This circuit may be used for driving thyratrons which require a high voltage input to turn them on. With the high voltage and short rise time pulse produced the total turn-on time of a typical thyratron can be reduced to one-tenth of the former specified value. To attain this, the present invention contemplates a pair of avalanche transistors or an avalanche transistor and a silicon controlled rectifier used in series to activate a transformer connected to the thyratron. The transistors are powered from an inverter power supply utilizing a single silicon controlled rectifier powered from a low voltage D.C. battery, the inverter silicon controlled rectifier being actuated by an output pulse from the actuation of the first silicon controlled rectifier.

Accordingly, it is an object of the present invention to provide a high rise pulse supply having a high peak voltage and power output with extremely short rise time.

Another object of the invention is to provide a high rise pulse supply utilizing only transistors.

Yet another object of the invention is to provide a high rise pulse supply system which is off between pulses, achieving high efficiency.

Still another object of the invention is to provide a high rise pulse supply which is pulse charged by an inverter from a D.C. source.

A further object of the invention is to provide an improved power supply for steady state D.C. voltage loads.

Other objects and many of the attendant advantages of this invention will be readily appreciated at the same becomes better understood by reference to the following detailed description when considered in connection with the accompanying drawings in which like reference numerals designate like parts throughout the figures thereof and wherein.

Figure 1:
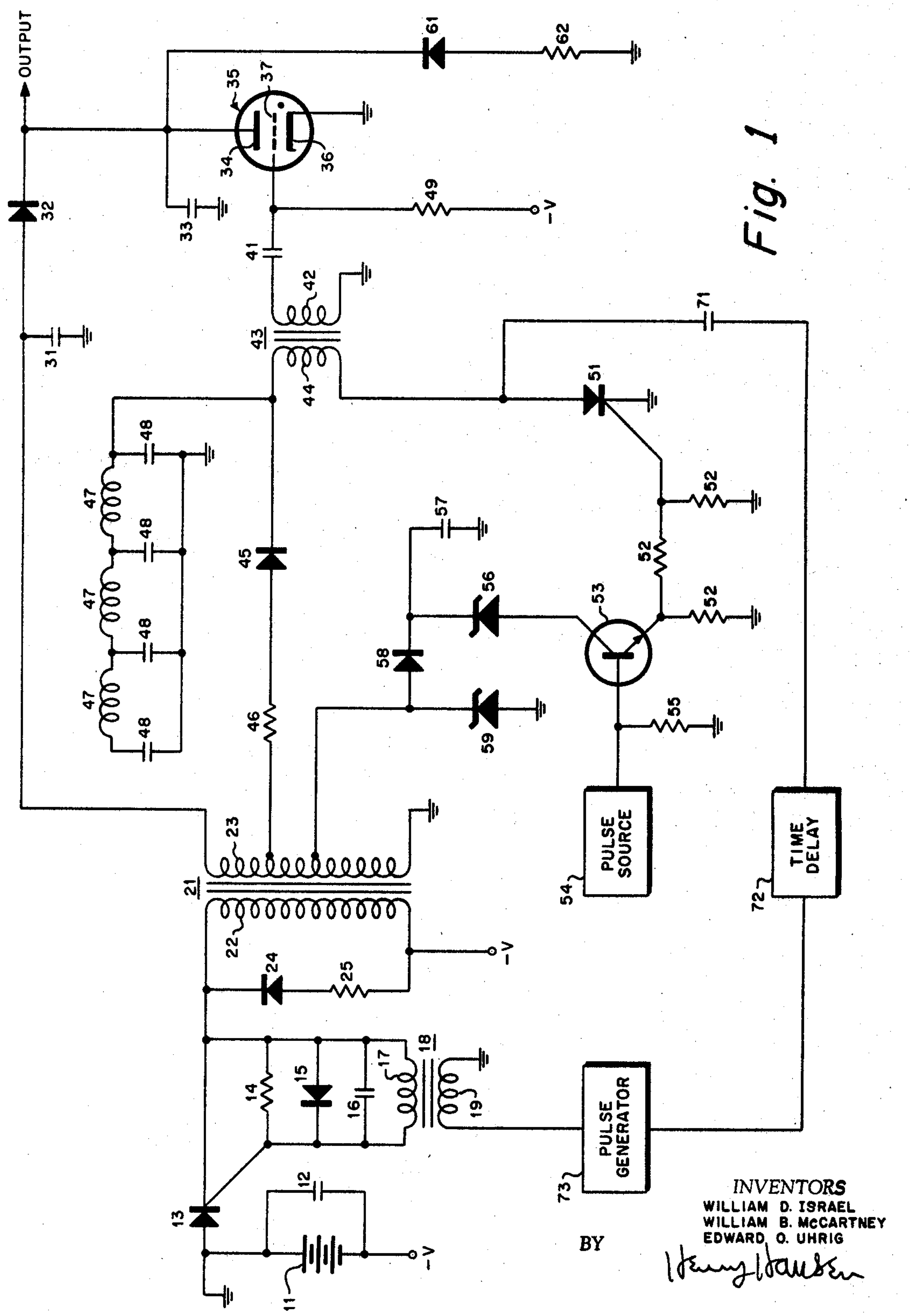
FIG. 1 shows a circuit diagram of a thyratron driver having the combined high rise pulse supply and power supply according to the invention.

In FIG. 1 there is shown a battery 11 having a voltage in the neighborhood of 28 to 32 volts thereon. The positive terminal of battery 11 is connected to ground. The negative terminal provides a negative voltage for various points in the circuit as will be explained subsequently. In parallel with battery 11 to absorb sudden demands of current is a capacitor 12. A silicon controlled rectifier 13 has its anode connected to ground and its gate and cathode connected to a circuit comprising a resistance 14, diode 15, capacitance 16 and secondary 17 of a transformer 18. Transformer 18 also has a primary coil 19, one end of which is connected to ground.

A transformer 21 has its primary 22 connected to the cathode of silicon controlled rectifier 13 and the other end of primary 22 connected to the negative terminal of battery 11, designated in FIG. 1 as "—V." The secondary 23 of transformer 21 has one end connected to ground and is tapped at various points on the coil for purposes which will be explained subsequently. In shunt with the primary 22 of transformer 21 are a diode 24 and a low resistance 25 for dissipating energy in one direction from transformer 21.

An end of transformer secondary 23 is linked to one side of a capacitance 31 and to the anode of diode 32. The cathode of diode 32 is linked to a capacitance 33 and to the anode 34 of a thyratron 35. Thyratron 35 also has a cathode 36 which is connected to ground and a grid 37 which is linked in the circuit in a manner which will now be described.

Grid 37 is linked through a capacitance 41 to the secondary 42 of a transformer 43, the primary 44 of which is linked through a diode 45 and resistance 46 to a tap on the secondary 23 of transformer 21. Also linked to the same end of transformer primary 44 is a pulse forming network composed of inductances 47 and capacitances 48. A resistance 49 links grid 37 to the "—V" terminal.

The other end of transformer primary 44 is connected to the anode of a silicon controlled rectifier 51, the cathode of which is connected to ground. The gate of silicon controlled rectifier 51 is connected to a $\pi$ resistance network of resistances 52 which is connected to the emitter of an avalanche transistor 53. The base of avalanche transistor 53 is connected to a pulse source 54 with a resistance shunt 55 to ground. Source 54 need only be one volt for 10 nanoseconds. The collector of avalanche transistor 53 is connecetd to a Zener diode 56 which is connected to a capacitor 57. Zener diode 56 is also connected to a diode 58, which is linked to another Zener diode 59. The common point of diode 58 and Zener diode 59 is linked to a tap on the transformer secondary 23.

A diode 61 and a low resistance 62 link anode 34 to ground to insure that there will not be a substantial negative voltage at the output.

The anode of silicon controlled rectifier 51 is linked through a capacitance 71 and a time delay 72 to a pulse generator 73, which generates a pulse passing through the primary 19 of transformer 18.

Figure 2:
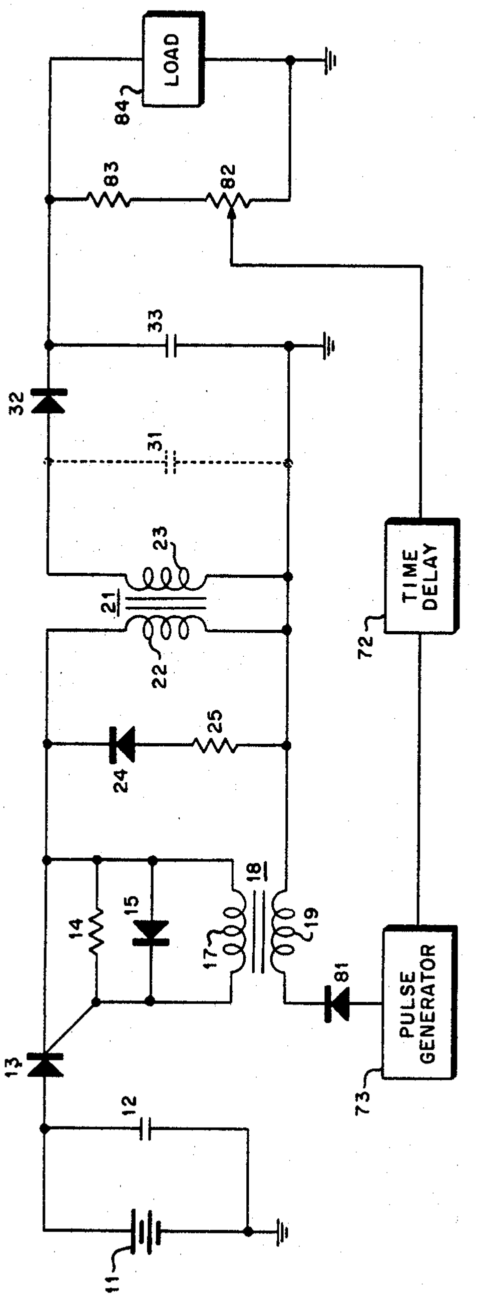
FIG. 2 shows a D.C. to D.C. converter similar to the power supply in FIG. 1 connected to a constant load.

In FIG. 2 is shown the inverter portion of the pulse supply of FIG. 1 adapted to supply a steady high D.C. voltage. It will be noted that the ground point instead of being attached to the plus side of battery 11 is attached to the minus side. Ground is also therefore attached to the transformer primary 22. Capacitance 31 is shown in dotted lines in this figure because, if designed appropriately, the distributed capacitance may be sufficient to cause a reverse voltage in the transformer enough to turn silicon controlled rectifier 13 off. Therefore, capacitance 31 may be either the distributed capacitance or a specified capacitance if desired. A diode 81 is inserted in series between pulse generator 73 and transformer primary 9. The pulse generator 73 gets its signal through time delay 72 from an adjustable tap 82 connected in series with another resistance 83 which is connected to the top of capacitor 33. The output of the converter which appears at the top of capacitance 33 is led to a steady load 84.

Figure 3:
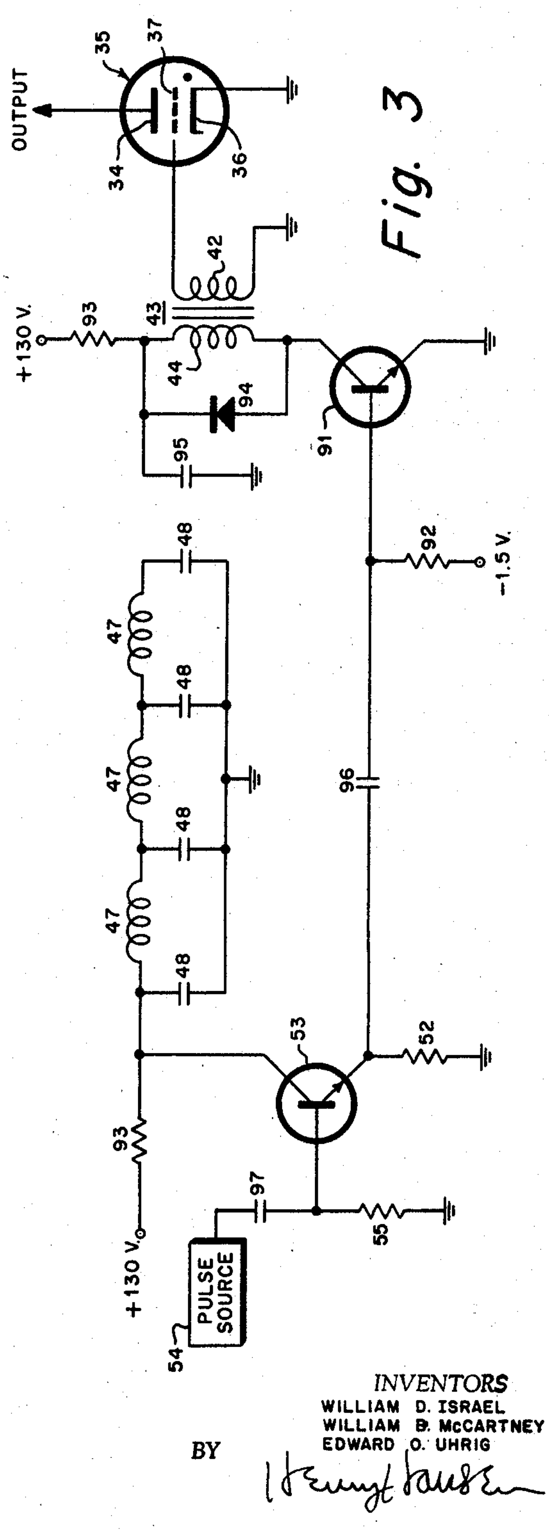
FIG. 3 shows a pulse supply thyratron driver similar to FIG. 1 but powered from a steady high voltage D.C. source.

In FIG. 3 there is shown another embodiment of the pulse supply utilizing steady high voltage D.C. sources. In this embodiment a second avalanche transistor 91 is substituted for the silicon controlled rectifier 51. Transistor 91 is biased through a resistance 92 to a negative 1.5 volt source. The 130 volt source is connected to the collector of transistor 53 and to the transformer primary 44 through high resistances 93. The pulse forming network comprising inductances 47 and capacitances 48 is linked to the collector of transistor 53 rather than to the transformer primary 44. Across transformer primary 44 there is a diode 94 to pevent surge back voltages through the transformer 43 and a capacitance 95 to store a charge for use as will be explained subsequently. The emitter of transistor 53 is connected to the base of transistor 91 through a capacitance 96. Pulse source 54 may be linked to the base of transistor 53 by a capacitance 97.

The operation of the thyratron driver of FIG. 1 is as follows. When the instrument is turned on a start pulse from a separate source is fed to pulse generator 73. This feeds through transformer 18 to put a positive voltage on the gate of silicon controlled rectifier 13. The result of this is to fire a 28 volt pulse through the primary of transformer 21. Transformer 21 is a high step-up transformer which provides a set of three voltages in the secondary. The first of these puts a very high voltage charge on capacitor 33 connected to the output and to the anode of thyratron 35. The second of these through diode 45 puts a charge on pulse forming network 47, 48. The third of these acts through diode 58 to put a charge on capacitor 57. Zener diodes 56 and 59 insure that there is no more than the necessary voltage on capacitor 57 and the anode of diode 58. As will be apparent the rated voltage of Zener diode 59 must be greater than the rated voltage of Zener diode 56. As long as there is no signal on the base of transistor 53 neither transistor 53 nor silicon controlled rectifier 51 will conduct to any substantial degree. Therefore, there is no pulse permitted through transformer 43 and no output into the thyratron. Pulse source 54 is a source of a signal which indicates when it is desired to fire the thyratron. When a pulse is received from pulse source 54 on the base of transistor 53 it discharges. The characteristic of avalanche transistor 53 is that when there is a signal on its base it goes to a substantially reduced resistance in a rush or avalanche. The result is to transfer the voltage on capacitor 57 through the $\pi$ resistance network 52 to the gate of silicon controlled rectifier 51. It, therefore, also opens up. Transistor 53 and rectifier 51 may be considered as switches. The result of this is to allow pulse forming network 47, 48 to discharge through the primary of transformer 43. Step-up transformer 43 is a very high step-up transformer, 5:1 or more, the secondary of which may generate as high as 500 volts to be applied to the grid 37 of thyratron tube 35. Since thyratron tube 35 still has the voltage which has been placed on capacitor 33 it will then fire producing a negative going pulse at the output. The effect of firing silicon controlled rectifier 51 also is to produce through time delay 72 a signal pulse to pulse generator 73 which operates to reactivate silicon controlled rectifier 13 and recharge the capacitor 33, pulse forming network 47, 48 and capacitance 57. The circuit is then recharged to await the next pulse from pulse source 54. Because the thyratron requires in the order of 250 volts on grid 37 to fire and the voltage on the secondary 42 of transformer 43 is in the neighborhood of 500 volts, the voltage operable to fire thyratron 35 has an exceedingly short rise time amounting to a delay after the receipt of a pulse from pulse source 54 of less than 100 nanoseconds, and as low as 40 nanoseconds.

In order to shut off silicon controlled rectifier 13 the capacitance 31 after the initial firing of the secondary 23 and charging of capacitance 33 discharges again into the secondary 23 producing a voltage surge in the primary 22 which operates to shut off rectifier 13. In order to prevent an oscillation which could cause a strong negative going voltage on the cathode of silicon controlled rectifier 13, diode 24 and low resistance 25 are provided to dissipate the energy in transformer 21. With the negative voltage restored to the gate of silicon controlled rectifier 13, rectifier 13 is substantially cut off to await the next pulse from pulse generator 73.

In the D.C. to D.C. converter shown in FIG. 2 the operation is essentially the same. Capacitor 31 is shown in dotted lines because the distributed capacitance in the circuit may be sufficient to cause a reverse surge in transformer 21 to shut off silicon controlled rectifier 13. The negative terminal of battery 11 may be connected to ground along with one end of primary 22 of transformer 21. The resistance 83 and adjustable tap 82 provide the signal back through time delay 72 to pulse generator 73 to cause the transformer 18 to fire rectifier 13 again. Since in this case the feedback pulse does not have to await any independent event the pulse train is continuous through diode 32. Capacitance 33 is left charged and is operative in this case to absorb the A.C. component of the signal produced, with the result that a D.C. voltage appears across resistances 83 and 82 and across load 84. There is still, however, enough A.C. signal in tap 82 to reactivate pulse generator 73. The voltage applied to load 84 is substantially a high D.C. voltage with excellent regulation characteristics. Efficiency has been determined at over 80%. Adjustable tap 82 may be used to adjust the frequency of firing silicon controlled rectifier 13 and, therefore, the voltage appearing on load 84.

In FIG. 3 is shown a modified pulse supply where high D.C. voltages are available. The pulse supply of FIG. 3 also utilizes a second avalanche transistor 91 in place of silicon controller rectifier 51. Avalanche transistor 91 is a large power avalanche transistor which is fired by a pulse roughly corresponding to the size of pulse which comes out of the emitter of transistor 53. The use of two avalanche transistors is preferable for economy reasons to the use of silicon controlled rectifiers. Pulse forming network 47, 48 is attached to the collector of transistor 53 and receives a charge from the 130 volt source as does capacitor 95 connected to transformer 43. When transistors 53 and 91 are fired the charge on pulse forming network 47, 48 is discharged through transistor 53 and the charge on capacitor 95 is discharged through transistor 91 but immediately thereafter the voltage on the collector of each transistor is reduced nearly to zero, thereby shutting the transistors off again. To prevent any back surge diode 94 is provided on transformer 43 to dissipate energy in the reverse direction. As before thyratron 35 may be fired or the pulse supply may be led to some other use. The output of thyratron 35 is connected through a load to a high D.C. voltage source. Also, there will be connected in the load a pulse forming network which after firing the thyratron 35 will shut it off thereby rendering the negative bias on grid 37 unnecessary. It will be seen, of course, that FIGS. 2 and 3 may be combined to produce the combined pulse supply of FIG. 1.

It will be understood that various changes in the details, steps and arrangement of parts which have been herein described and illustrated in order to explain the nature of the invention may be made by those skilled in the art within the principle and scope of the invention as expressed in the appended claims.

What is claimed is:

1. A high rise pulse supply comprising:
- a pulse generator;
- power pulse supply means having a D.C. voltage source and a first switch means, said first switch means connected to said pulse generator and responsive thereto;
- a first transformer having a primary and a secondary, said primary connected with said first switch means and operative to reflect a voltage produced by said voltage source into said secondary upon the application of a pulse from said pulse generator;
- a load connected to said secondary;
- circuit means interposed between said secondary and said load responsive to the voltage in said secondary; and
- an electrical delay line connected with said pulse generator and said circuit means and responsive to said circuit means to provide a signal to said pulse generator.

2. The invention according to claim 1 wherein said power pulse supply means further comprises:
- a second transformer having a primary connected at its respective ends to said pulse generator and to ground and a secondary connected across two terminals of said first switch means;
- a resistor connected across said terminals; and
- a diode in parallel with said resistor.

3. The invention according to claim 1 further including:
- a capacitor connected across the secondary of said first transformer and operative to produce a voltage surge therein which is reflected into the primary of said transformer thereby shutting off said first switch means.

4. The invention according to claim 3 wherein said first switch means comprises:
- a silicon controlled rectifier having its anode connected to said D.C. voltage source and its cathode and gate connected respectively to one end of said first transformer primary and one end of said second transformer secondary.

5. The invention according to claim 1 wherein said circuit means includes:
- a diode connected in series between said first transformer secondary and said load;

- a capacitor connected across said secondary; and
- a variable resistance connected between said diode and said delay line for controlling the voltage appearing on said load.

6. The invention according to claim 1 wherein said circuit means includes:
- a third transformer having a primary coil and a secondary coil;
- a second switch means connected in series with said primary and activated by a large signal;
- a third switch means connected to a terminal of said second switch means and operative to provide said large signal to said second switch means; and
- pulse means to activate said second switch.

7. The invention according to claim 6 wherein said third switch means is an avalanche transistor having its base connected to said pulse means, its emitter connected to said terminal of said second switch means, and its collector connected to said first transformer secondary.

8. The invention according to claim 7 further including a pulse forming network capable of storing a charge connected in parallel with the primary coil of said third transformer.

9. The invention according to claim 7 wherein said pulse forming network is also connected to one end of said primary coil of said third transformer.

10. The invention according to claim 9 wherein said large power pulse source is activated through said delay line by the activation of said second switch means to recharge said pulse forming network after its discharge.

11. The invention according to claim 10 further including a capacitance-diode network connected to the collector of said avalanche transistor to hold a charge upon pulsing of said first transformer.

12. The invention according to claim 6 wherein said said second switch means is a silicon controlled rectifier.

13. The invention according to claim 6 wherein said second switch means is a high power avalanche transistor.

References Cited

UNITED STATES PATENTS

| | | | |
|---|---|---|---|
| 3,045,148 | 7/1962 | McNulty et al. | 315—206 X |
| 3,078,391 | 2/1963 | Bunodiere et al. | 315—219 X |
| 3,165,669 | 1/1965 | Marcotte | 315—237 |
| 3,240,198 | 3/1966 | Loudon et al. | 315—209 X |
| 3,263,124 | 7/1966 | Stuermer | 315—212 |
| 3,303,356 | 2/1967 | Bell | 307—88.5 |

JOHN W. HUCKERT, *Primary Examiner.*

JAMES D. KALLAM, *Examiner.*

R. F. POLISSACK, *Assistant Examiner.*